United States Patent [19]
Watanabe

[11] Patent Number: 5,786,939
[45] Date of Patent: Jul. 28, 1998

[54] ILLUMINATION OPTICAL SYSTEM

[75] Inventor: Fumio Watanabe, Omiya, Japan

[73] Assignee: Fuji Photo Optical Co., Ltd., Omiya, Japan

[21] Appl. No.: 792,570

[22] Filed: Jan. 30, 1997

Related U.S. Application Data

[63] Continuation-in-part of Ser. No. 606,942, Feb. 26, 1996, abandoned.

[51] Int. Cl.$^6$ .............................. G02B 27/10; G03B 21/14
[52] U.S. Cl. .......................... 359/621; 359/622; 359/626; 359/631; 353/38
[58] Field of Search ...................... 359/621, 622, 359/619, 631, 626; 353/38; 355/67, 47

[56] References Cited

U.S. PATENT DOCUMENTS

| | | | |
|---|---|---|---|
| 3,296,923 | 1/1967 | Miles | 359/621 |
| 4,497,015 | 1/1985 | Konno et al. | 359/621 |
| 4,682,885 | 7/1987 | Torigoe | 359/621 |
| 5,418,583 | 5/1995 | Masumoto | 353/38 |
| 5,719,706 | 2/1998 | Masumoto et al. | 359/621 |

FOREIGN PATENT DOCUMENTS

| | | |
|---|---|---|
| 3-111806 | 5/1991 | Japan. |
| 5-346557 | 12/1993 | Japan. |

*Primary Examiner*—Georgia Y. Epps
*Assistant Examiner*—Evelyn A. Lester
*Attorney, Agent, or Firm*—Ronald R. Snider

[57] ABSTRACT

In an integrator illumination type illumination optical system, the opening shapes of respective lenses at first and second lens array plates (surfaces) are made substantially conformable to the shape of an area to be illuminated and predetermined conditional expressions are satisfied, thereby securely improving the light utilization efficiency and reducing the fluctuation in illumination. The illumination optical system comprises a light source portion constituted by an emitter (1) and an ellipsoidal mirror reflector (3) which reflects, in the direction of an optical axis X, luminous fluxes (2) emitted from the emitter (1); a first lens array plate (4) which acts on the luminous fluxes (2) from the light source portion; a second lens array plate (5) which superposes the respective luminous fluxes from the first lens array plate (4) onto a liquid crystal panel (7) which is an object to be illuminated; and a convex lens (6). The opening shapes of the respective lenses in the first lens array plates (4) and second lens array plate (5) are made substantially conformable to the shape of the front surface of the liquid crystal panel (7), while four conditional expressions defining the relative distances and sizes of the members (4, 5, and 7) are satisfied.

6 Claims, 4 Drawing Sheets

ILLUMINATION OPTICAL SYSTEM

RELATED APPLICATIONS

This application is a Continuation in Part of Ser. No. 08/606,942, Illumination Optical System, inventor: Fumio Watanabe, filed on Feb. 26, 1996, now abandoned.

BACKGROUND OF THE INVENTION

1. Field of the Invention

The present invention relates to an integrator type illumination optical system used for illuminating, for example, light bulbs. More specifically, it relates to an integrator type illumination optical system using a lens array plate.

2. Description of the Prior Art

Conventionally, there has been known an illumination method called "relay condenser technique" which is a kind of Koehler illumination method. In this illumination method, an image of a light source is relayed so as to form an image near a pupil of a projection lens, thereby forming an image of the light source at an infinitely far position by a condenser, whereby illumination is prevented from fluctuating due to fluctuation in luminance of the light-emitting portion. However, when light sources having fluctuations in their light distribution characteristics such as metal halide lamp, xenon lamp, and halogen lamp are used in this method, their illumination may fluctuate accordingly. This may cause a serious problem.

On the other hand, there has been known a technique called "integrator" using lens array and lenticular plate, which can eliminate the fluctuations caused by the light distribution characteristics of the light sources. Also, various proposals have been made concerning techniques for dividing its luminous flux (e.g., Japanese Unexamined Patent Publication Heisei No. 3-111806).

Namely, such an illumination optical apparatus comprises, behind a concave-mirror type illumination optical apparatus, a first lens array plate, a second lens array plate, and a third lens additionally disposed in this order. The first lens array plate is constituted by a plurality of lenses arranged two-dimensionally. Similarly, the second lens array plate is constituted by a plurality of lenses arranged two-dimensionally. The first lens array plate divides a single luminous flux having a large fluctuation in brightness emitted from the concave mirror into partial luminous fluxes whose number is the same as the number of lenses in the first lens array plate. The fluctuation in brightness of thus divided partial luminous flux is smaller than that in the undivided single luminous flux. These partial luminous fluxes are respectively emitted by the second lens array plate toward an area to be illuminated, while being superposed on each other by the third lens onto the area to be illuminated, whereby illumination having a small fluctuation in brightness can be realized.

However, even in such prior art using the integrator technique, depending on the positions of two lens array plates or lens positioned in front of the area to be illuminated as well as the shape of opening of each lens in the lens array plates, the light utilization efficiency may be problematic and the fluctuation in illumination may often become rather greater. Conventionally, in view of such a circumstance, experiments and trials have been repeated so as to determine the position or size of each member in a cut and try manner. Therefore, desirable effects have not always been attained, thereby deteriorating the efficiency in manufacture of the apparatus and increasing its manufacturing cost.

SUMMARY OF THE INVENTION

The object of the present invention is to securely attain improvement in the light utilization efficiency and decrease in fluctuation in brightness in an illumination optical system, while improving the manufacturing efficiency of the apparatus and decreasing its manufacturing cost.

The first illumination optical system in accordance with the present invention comprises, in this order, a light source portion constituted by an emitter and an ellipsoidal mirror whose cofocal positions are substantially at the position of the emitter and the position of an object to be illuminated; a first lens array plate formed by a plurality of lenses having substantially identical opening shapes arranged two-dimensionally; and a second lens array plate formed by a plurality of lenses having substantially identical opening shapes arranged two-dimensionally;

in which the opening shapes of respective lenses in the first and second lens array plates are substantially conformable to the shape of the area to be illuminated and following conditional expressions (1) to (4) are satisfied:

$$1.0 < k1 \times s2/s1 < 1.8 \quad (1)$$

$$1.0 < k2 \times (s1+s2)/s1 < 1.8 \quad (2)$$

$$0.8 < f1 \times s2/[s1 \times (s1+s2)] < 2.0 \quad (3)$$

$$0.8 < f2 \times (s1+s2)/(s1 \times s2) < 2.0 \quad (4)$$

wherein:

s1: distance between the first lens array plate and second lens array plate, s2: distance between the second lens array plate and the object to be illuminated, k1: ratio of conformity of the opening shape of each lens in the first lens array plate to the shape of the area to be illuminated, k2: ratio of conformity of the opening shape of each lens in the second lens array plate to the shape of the area to be illuminated, f1: focal length of the first lens array plate, and f2: focal length of the second lens array plate.

The second illumination optical system in accordance with the present invention comprises, in this order, a light source portion constituted by an emitter and a parabolic mirror whose focal position is substantially at the position of the emitter; a first lens array plate formed by a plurality of lenses having substantially identical opening shapes arranged two-dimensionally; and a second lens array plate formed by a plurality of lenses having substantially identical opening shapes arranged two-dimensionally;

in which the opening shapes of respective lenses in the first and second lens array plates are substantially conformable to the shape of the area to be illuminated, the optical axis of a lens in the first lens array plate and that of a lens corresponding thereto in the second lens array plate coincide with each other, and the following conditional expressions (5) to (8) are satisfied:

$$1.0 < k1 \times s2/s1 < 1.8 \quad (5)$$

$$1.0 < k2 \times (s1+s2)/s1 < 1.8 \quad (6)$$

$$0.7 < f1/s1 < 1.7 \quad (7)$$

$$0.8 < f2 \times (s1+s2)/(s1 \times s2) < 2.0 \quad (8)$$

wherein:

s1: distance between the first lens array plate and second lens array plate, s2: distance between the second lens array plate and the object to be illuminated, k1: ratio of conformity of the opening shape of each lens in the first lens array plate to the shape of the area to be illuminated, k2: ratio of conformity of the opening shape of each lens in the second lens array plate to the shape of the area to be illuminated, f1: focal length of the first lens array plate, and f2: focal length of the second lens array plate.

Further, the third illumination optical system in accordance with the present invention comprises:

a light source portion constituted by an emitter and an ellipsoidal mirror whose cofocal positions are substantially at the position of the emitter and the position of an object to be illuminated and a lens array plate having first and second lens array surfaces which are formed by a plurality of lenses having substantially identical opening shapes arranged two-dimensionally such that the first lens array surface faces the emitter;

in which the opening shapes of respective lenses in the first and second lens array surfaces are substantially conformable to the shape of the area to be illuminated and the following conditional expressions (9) to (12) are satisfied:

$$0.6 < k1 \times s/d < 1.2 \quad (9)$$

$$0.6 < k2 \times s/d < 1.2 \quad (10)$$

$$0.25 < R1/d < 0.45 \quad (11)$$

$$0.25 < R2/d < 0.45 \quad (12)$$

wherein:

d: thickness of the lens array plate, s: distance between the lens array plate and the object to be illuminated, k1: ratio of conformity of the opening shape of each lens at the first lens array surface (lens array surface facing the light source portion) to the shape of the area to be illuminated, k2: ratio of conformity of the opening shape of each lens at the first lens array surface (lens array surface facing the object to be illuminated) to the shape of the area to be illuminated, R1: radius of curvature of each lens at the first lens array surface, and R2: radius of curvature of each lens at the second lens array surface.

In each of the foregoing illumination optical systems, a lens which directs the illumination light from the above-mentioned second lens array plate or second lens array surface to a predetermined position behind the above-mentioned object to be illuminated may be disposed in front of the object to be illuminated.

DETAILED DESCRIPTION OF THE PREFERRED EMBODIMENTS

In the following, embodiments of the present invention will be explained with reference to the drawings.

(First Embodiment)

Figure 1:
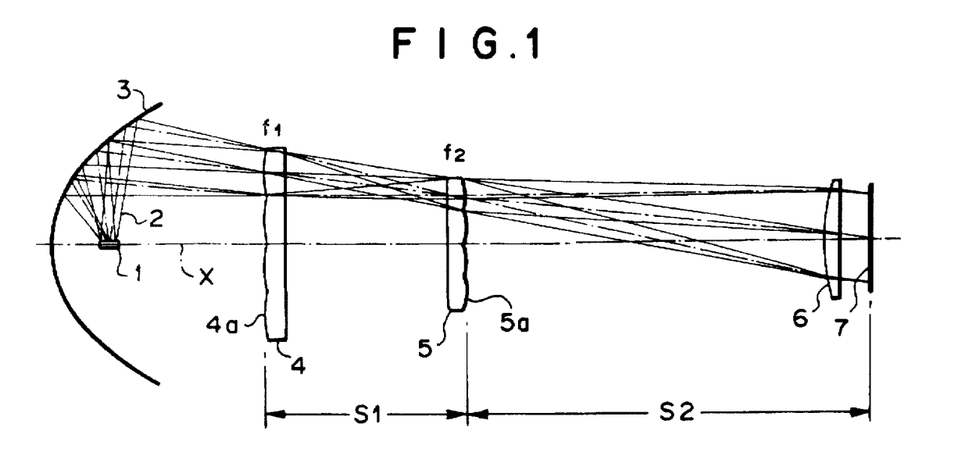
FIG. 1 is a cross-sectional view showing an illumination optical system in accordance with the first embodiment of the present invention.

FIG. 1 is a schematic view showing the illumination optical system in accordance with the first embodiment of the present invention. Namely, this illumination optical system comprises a light source portion constituted by an emitter 1 and a reflector 3 which reflects, in the direction of an optical axis X, luminous fluxes 2 emitted from the emitter 1; a first lens array plate 4 which acts on the luminous fluxes 2 from the light source portion; a second lens array plate 5 which superposes the respective luminous fluxes from the first lens array plate 4 onto a liquid crystal panel 7 which is an object to be illuminated; and a convex lens 6.

Figure 2A:
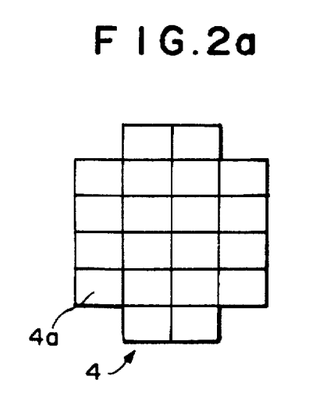
FIGS. 2A and 2B are plan views respectively showing, in detail, the first and second lens array plates shown in FIG. 1.
Figure 2B:
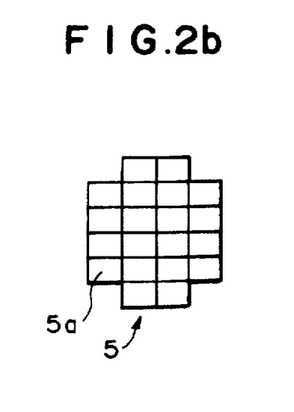

The above-mentioned reflector 3 is formed by an ellipsoidal mirror whose cofocal positions are the positions where the emitter 1 and the object to be illuminated 7 are respectively disposed. The reflector 3 can reflect the luminous fluxes 2 emitted from near one of the cofocal positions so as to make them pass through the centers of the openings of the respective lenses in the first lens array plate 4 and those of the respective lenses in the second lens array plate 5 and substantially direct them to the center of the area to be illuminated which is positioned near the other cofocal position (substantially corresponding to the front surface of the liquid crystal panel 7), thereby improving the light utilization efficiency in illumination. Also, as shown in FIGS. 2A and 2B, the first lens array plate 4 and the second lens array plate 5 are formed by identical numbers of lenses which are arranged two-dimensionally, while the lenses at respective lens array surfaces 4a and 5a of the first and second lens array plates 4 and 5 form opening portions which have substantially identical shapes. The opening shapes of the respective lenses at the lens array surfaces 4a and 5a in the first and second lens array plates 4 and 5 and the shape of the front surface of the liquid crystal panel 7 are conformable to each other and set so as to satisfy the following conditional expressions (1) to (4):

$$1.0 < k1 \times s2/s1 < 1.8 \quad (1)$$

$$1.0 < k2 \times (s1+s2)/s1 < 1.8 \quad (2)$$

$$0.8 < f1 \times s2/[(s1)\times(s1+s2)] < 2.0 \quad (3)$$

$$0.8 < f2 \times (s1+s2)/(s1 \times s2) < 2.0 \quad (4)$$

wherein:
- s1: distance between the first lens array plate and second lens array plate,
- s2: distance between the second lens array plate and the object to be illuminated,
- k1: ratio of conformity of the opening shape of each lens in the first lens array plate to the shape of the area to be illuminated,
- k2: ratio of conformity of the opening shape of each lens in the second lens array plate to the shape of the area to be illuminated,
- f1: focal length of the first lens array plate, and
- f2: focal length of the second lens array plate.

Here, the values of the above variables and conditional expressions set in this embodiment are shown in Table 1 as follows:

In this embodiment, the first lens array plate 4 forms images of the emitter 1, which have the number identical to the number of lenses constituting the first lens array plate 4, near the second lens array group 5, thereby making these multiple images illuminate the liquid crystal panel 7. Accordingly, influence of the fluctuation in brightness of the emitter can be eliminated. Namely, while the density remains to vary in the light quantity distribution of respective luminous fluxes passing through the first lens array plate 4 due to the fluctuation in emission characteristics of the emitter 1, the second lens array plate 5 projects the images of the opening portions of the respective lenses of the first lens array plate 4 with a magnification which fully covers the liquid crystal panel 7 and these images are superposed on the liquid crystal panel 7 with the number of superpositions corresponding to the number of the lenses. Accordingly, the fluctuation in illumination due to the emission characteristics of the emitter 1 can be reduced so as to realize uniform illumination.

Also, the opening shapes of the respective lenses in the first and second lens array plates 4 and 5 are made substantially conformable to the shape of the area to be illuminated (front surface of the liquid crystal panel 7). Accordingly, the loss in illumination light is reduced, while improving the light utilization efficiency in illumination.

In this embodiment, the lens surface 4a of the first lens array plate 4 is formed so as to face the emitter 1. Since the spherical aberration and sine condition can be reduced thereby, it becomes advantageous in view of the light utilization efficiency. Of course, both surfaces may be formed as lens surfaces. Also, this lens surface can be formed aspherical or as a Fresnel surface.

Further, the second lens array plate 5 has the lens surface 5a facing the liquid crystal panel 7. Since the spherical aberration and sine condition can be reduced thereby, it becomes advantageous in view of the uniformity of illumination. Of course, both surfaces may be formed as lens surfaces. Also, this lens surface can be formed aspherical or as a Fresnel surface.

The lens 6 disposed directly in front of the liquid crystal panel 7 functions to direct the illumination light to an appropriate direction. Namely, in cases where the object to be illuminated is a transmission type element and further projected to other objects to be illuminated by way of a projection lens as in the case of this embodiment, the form and position of the lens 6 are set so as to direct light to a position near the entrance pupil of such a projection lens.

Above the upper limit of the above-mentioned conditional expression (1), a considerable amount of the light which has reached the first lens array plate 4 will be lost, thereby decreasing the light utilization efficiency; whereas, below its lower limit, light will not be supplied to the periphery of the area to be illuminated, thereby generating fluctuations in illumination. By contrast, since the present embodiment is set so as to satisfy this conditional expression, both light utilization efficiency and illumination uniformity can be made favorable.

Also, outside of the upper and lower limits of the above-mentioned conditional expression (2), the light from the emitter cannot be efficiently transmitted to the area to be illuminated, thereby deteriorating the uniformity in illumination and the light utilization efficiency. By contrast, since the present embodiment is set so as to satisfy this conditional expression, both light utilization efficiency and illumination uniformity can be made favorable.

Further, outside of the upper and lower limits of each of the above-mentioned conditional expressions (3) and (4), the light which has reached the first lens array plate 4 cannot be efficiently transmitted to the area to be illuminated, thereby deteriorating the light utilization efficiency. By contrast, since the present embodiment is set so as to satisfy these conditional expressions, the light utilization efficiency can be made favorable.

Next, the radius of curvature r (mm) of each member of the illumination optical system in accordance with the first embodiment, the central thickness of each member and air distance between respective members (generically referred to as "axial surface distance" in the following) d (mm), and refractive index N of each member with respect to d-rays are shown in Table 2. Also, this table shows the distance between the emitter and the reflector, the distance between the object to be illuminated and the lens, the size of the area to be illuminated, the opening sizes of respective lenses in the first and second lens array plates, and the shape of the reflector.

TABLE 2

|  | r | d | N |
| --- | --- | --- | --- |
| Reflector |  | 68.0 |  |
| First lens array plate | 41.74 | 7.0 | 1.48 |
|  | ∞ | 51.3 |  |
| Second lens array plate | ∞ | 5.5 | 1.48 |
|  | −21.09 | 112.5 |  |
| Lens | 64.11 | 5.5 | 1.52 |
|  | ∞ |  |  |

Position of the emitter: 18.0 mm from the reflector,

Position of the object to be illuminated: 10.4 mm from the surface of the lens facing the object, Area to be illuminated: 28.0 mm×21.0 mm;

Opening size of each lens in the first lens array plate: 15.3 mm×11.5 mm,

Opening size of each lens in the second lens array plate: 10.4 mm×7.8 mm, and

Ellipsoidal surface shape of the reflector:

c=0.02973 and k=−0.7543 in aspherical surface equation:

$$z = cy^2 / \{1 + [1-(1+k)c^2y^2]^{1/2}\} \tag{13}$$

(Second Embodiment)

Figure 3:
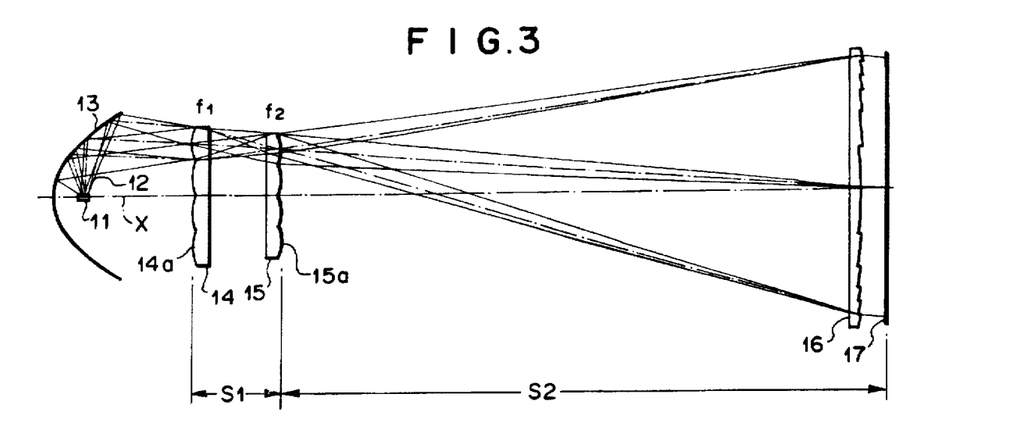
FIG. 3 is a cross-sectional view showing an illumination optical system in accordance with the second embodiment of the present invention.

FIG. 3 is a schematic view showing the illumination optical system in accordance with the second embodiment of the present invention. While being configured substantially similar to that of the first embodiment, this illumination optical system differs therefrom in that a convex Fresnel lens 16 is used in place of the normal convex lens 6 as a lens in front of a liquid crystal panel 17. When the Fresnel lens 16 is used, the thickness of the lens can be reduced, thereby making it advantageous in view of the space for accommodating the lens. In this embodiment, members having functions similar to those of the first embodiment are referred to by numbers obtained when 10 is added to those of the first embodiment, without repeating their explanations.

Figure 4A:
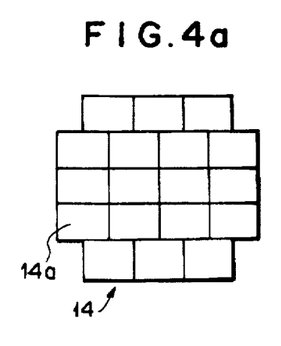
FIGS. 4A and 4B are plan views respectively showing, in detail, the first and second lens array plates shown in FIG. 3.
Figure 4B:
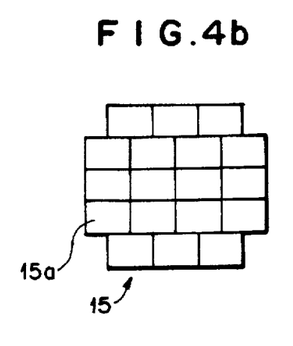

Here, the values of the above variables and conditional expressions set in this embodiment are shown in the above-mentioned Table 1. Also, the shapes of lens array surfaces 14a and 15a in first and second lens array plates 14 and 15 are respectively shown in FIGS. 4A and 4B.

Next, the radius of curvature r (mm) of each member of the illumination optical system in accordance with the second embodiment, the central thickness of each member and air distance between respective members (generically referred to as "axial surface distance" in the following) d (mm), and refractive index N of each member with respect to d-rays are shown in Table 3. Also, this table shows the distance between emitter and the reflector, the distance between the object to be illuminated and the lens, the size of the area to be illuminated, the opening sizes of respective lenses in the first and second lens array plates, the shape of the reflector, and the shape of the Fresnel lens.

TABLE 3

|  | r | d | N |
|---|---|---|---|
| Reflector |  | 7.0 |  |
| First lens array plate | 21.46 | 8.5 | 1.48 |
|  | ∞ | 28.8 |  |
| Second lens array plate | ∞ | 8.0 | 1.48 |
|  | −19.98 | 290.0 |  |
| Lens | ∞ | 5.5 | 1.52 |

Fresnel Aspherical Surface

Position of the emitter: 15.0 nm from the reflector,

Position of the object to be illuminated: 14.0 mm from the surface of the lens facing the object, Area to be illuminated: 132.0 mm×99.0 mm;

Opening size of each lens in the first lens array plate: 18.0 mm×13.5 mm,

Opening size of each lens in the second lens array plate: 16.0 mm×12.0 mm,

Ellipsoidal surface shape of the reflector:

c=0.03451 and k=−0.8682 in the above-mentioned aspherical surface equation (13), and Aspherical surface shape of the Fresnel lens:

c=−0.006757 and k=−0.9160 in the above-mentioned aspherical surface equation (13)

(Third Embodiment)

Figure 5:
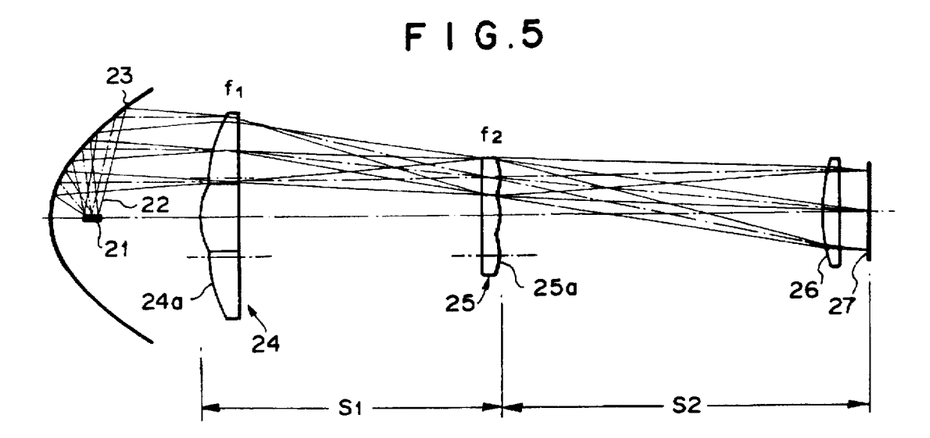
FIG. 5 is a cross-sectional view showing an illumination optical system in accordance with the third embodiment of the present invention.

FIG. 5 is a schematic view showing the illumination optical system in accordance with the third embodiment of the present invention. This embodiment is different from the above-mentioned first embodiment in that its reflector 23 has a different shape and, accordingly, lens shapes of respective lens array plates 24 and 25 are different from those of the first embodiment.

Namely, this illumination optical system comprises a light source portion constituted by an emitter 21 and a reflector 23 which reflects, in the direction of an optical axis X, luminous fluxes 22 emitted from the emitter 21; the first lens array plate 24 which acts on the luminous fluxes 22 from the light source portion; the second lens array plate 25 which superposes the respective luminous fluxes 22 from the first lens array plate 24 onto a liquid crystal panel 27 which is an object to be illuminated; and a convex lens 26.

The above-mentioned reflector 23 is formed by a parabolic mirror whose focal position is substantially at the position where the emitter 21 is disposed, such that the luminous fluxes 22 which have been emitted in various directions from near the focal position are reflected so as to be emitted in parallel to the optical axis.

Also, the optical axis of a lens in the first lens array plate 24 and that of the corresponding lens in the second lens array plate 25 coincide with each other, whereby the luminous fluxes 22 can pass through the centers of openings of the respective lenses in the first lens array plate 24 and those of the respective lenses in the second lens array plate 25 and substantially direct them to the center of the area to be illuminated which is positioned near the focal position (substantially corresponding to the front surface of the liquid crystal panel 27), thereby improving the light utilization efficiency in illumination.

Here, the values of the above variables and conditional expressions set in this embodiment are shown in the above-mentioned Table 1.

Figure 6A:
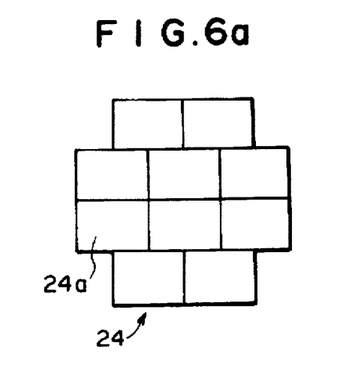
FIGS. 6A and 6B are plan views respectively showing, in detail, the first and second lens array plates shown in FIG. 5.
Figure 6B:
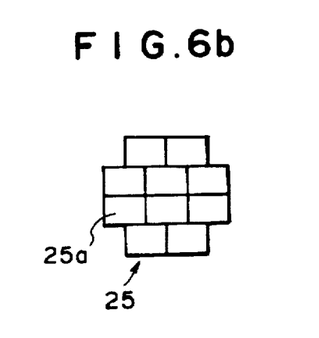

Also, as shown in FIGS. 6A and 6B, the first lens array plate 24 and the second lens array plate 25 are formed by identical numbers of lenses which are arranged two-dimensionally, while the lenses at respective lens array surfaces 24a and 25a of the first and second lens array plates 24 and 25 form opening portions which have substantially identical shapes. The opening shapes of the respective lenses at the lens array surfaces 24a and 25a in the first and second lens array plates 24 and 25 and the shape of the front surface of the liquid crystal panel 27 are conformable to each other and set so as to satisfy the following conditional expressions (5) to (8):

$$1.0 < k1 \times s2/s1 < 1.8 \tag{5}$$

$$1.0 < k2 \times (s1+s2)/s1 < 1.8 \tag{6}$$

$$0.7 < f1/s1 < 1.7 \tag{7}$$

$$0.8 < f2 \times (s1+s2)/(s1 \times s2) < 2.0 \tag{8}$$

wherein:

s1: distance between the first lens array plate and second lens array plate, s2: distance between the second lens array plate and the object to be illuminated, k1: ratio of conformity of the opening shape of each lens in the first lens array plate to the shape of the area to be illuminated, k2: ratio of conformity of the opening shape of each lens in the second lens array plate to the shape of the area to be illuminated, f1: focal length of the first lens array plate, and f2: focal length of the second lens array plate.

Since each optical member has substantially the same function as and can be modified in a similar manner to that of the first embodiment, detailed explanation is not provided therefor.

Here, the actions according to the above-mentioned conditional expressions (5), (6), (7), and (8) are substantially similar to those of the above-mentioned conditional expressions (1), (2), (3), and (4).

Next, the radius of curvature r (mm) of each member of the illumination optical system in accordance with the third embodiment, the central thickness of each member and air distance between respective members (generically referred to as "axial surface distance" in the following) d (mm), and refractive index N of each member with respect to d-rays are shown in Table 4. Also, this table shows the distance between the emitter and the reflector, the distance between the object to be illuminated and the lens, the size of the area to be illuminated, the opening sizes of respective lenses in the first and second lens array plates, and the shape of the reflector.

TABLE 4

|  | r | d | N |
|---|---|---|---|
| Reflector |  | 55.0 |  |
| First lens array plate | 45.18 | 10.0 | 1.48 |
|  | ∞ | 84.0 |  |
| Second lens array plate | ∞ | 6.0 | 1.48 |
|  | −25.95 | 110.0 |  |
| Lens | 58.40 | 5.5 | 1.52 |
|  | ∞ |  |  |

Position of the emitter: 14.0 from the reflector,
Position of the object to be illuminated: 10.0 mm from the surface of the lens facing the object,
Area to be illuminated: 28.0 mm×21.0 mm;
Opening size of each lens in the first lens array plate: 24.4 mm×18.3 mm,
Opening size of each lens in the second lens array plate: 14.0 mm×10.5 mm, and
Parabolic surface shape of the reflector:

c=0.03571 and k=−1.0000 in the above-mentioned aspherical surface equation (13).

(Fourth Embodiment)

Figure 7:
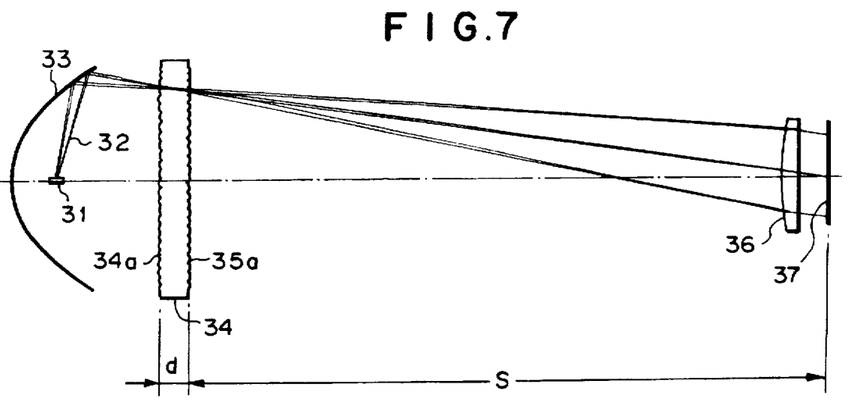
FIG. 7 is a cross-sectional view showing an illumination optical system in accordance with the fourth embodiment of the present invention.

FIG. 7 is a schematic view showing the illumination optical system in accordance with the fourth embodiment of the present invention. This fourth embodiment differs from the above-mentioned first embodiment in that a lens array plate 34 having two lens array surfaces 34a and 35a is used in place of the two lens array plates 4 and 5.

Namely, this illumination optical system comprises a light source portion constituted by an emitter 31 and a reflector 33 which reflects, in the direction of an optical axis X, luminous fluxes 32 emitted from the emitter 31; the lens array plate 34 having the first lens array surface 34 which acts on the luminous fluxes 32 from the light source portion and the second lens array surface 35a which superposes the respective luminous fluxes 32 from the first lens array surface 34a onto a liquid crystal panel 37 which is an object to be illuminated; and a convex lens 36.

The above-mentioned reflector 33 is formed by an ellipsoidal mirror whose cofocal positions are the positions where the emitter 31 and the object to be illuminated 37 are respectively disposed. The reflector 33 can reflect the luminous fluxes 32 emitted from near one of the cofocal positions so as to make them pass through the centers of the openings of the respective lenses in the first lens array surface 34a and those of the openings of the respective lenses in the second lens array surface 35a and substantially direct them to the center of the area to be illuminated which is positioned near the other cofocal position (substantially corresponding to the front surface of the liquid crystal panel 37), thereby improving the light utilization efficiency in illumination.

Figure 8A:
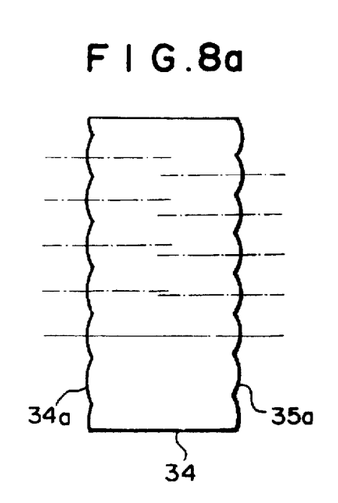
FIGS. 8A and 8B are respectively cross-sectional and plan views showing, in detail, the first and second lens array surfaces shown in FIG. 7.
Figure 8B:
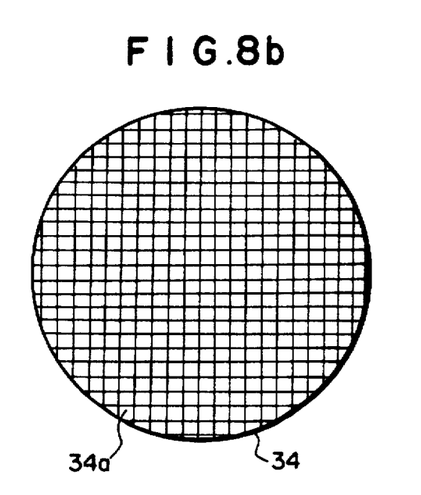

Also, each of the first lens array surface 34a and the second lens array surface 35a is formed by a plurality of microlenses arranged two-dimensionally, while the lens pitch in the second lens array surface 35a is formed smaller, by a predetermined ratio, than that in the first lens array surface 34a as shown in FIG. 8A. However, the central axes of the first and second lens surfaces 34a and 35a coincide with each other at the optical axis X. In cases where the lens pitches are set to predetermined values in this manner, when the luminous fluxes 32 reflected at the periphery of the reflector 33 are directed to the area to be illuminated, they can pass through the centers of openings of two corresponding lenses in the lens array surfaces 34a and 35a. Here, FIG. 8B is a schematic view showing the lens array plate 34 viewed from the side of the first lens array surface 34a. Thus, since the two lens array surfaces 34a and 35a are formed in a single member, the number of the members can be reduced in this embodiment, thereby making it easy to assemble and adjust the optical system.

As can be seen from these drawings, the lenses at respective lens array surfaces 34a and 35a of the lens array plate 34 form opening portions which have substantially identical shapes. The opening shapes of the respective lenses at the first lens array surface 34a and second lens array surface 35a in the lens array plate 34 and the shape of the front surface of the liquid crystal panel 37 are made conformable to each other and set so as to satisfy the following conditional expressions (9) to (12):

$$0.6 < k1 \times s/d < 1.2 \tag{9}$$

$$0.6 < k2 \times s/d < 1.2 \tag{10}$$

$$0.25 < R1/d < 0.45 \tag{11}$$

$$0.25 < R2/d < 0.45 \tag{12}$$

wherein:

d: thickness of the lens array plate, s: distance between the lens array plate and the object to be illuminated, k1: ratio of conformity of the opening shape of each lens at the first lens array surface (lens array surface facing the light source portion) to the shape of the area to be illuminated, k2: ratio of conformity of the opening shape of each lens at the first lens array surface (lens array surface facing the object to be illuminated) to the shape of the area to be illuminated, R1: radius of curvature of each lens at the first lens array surface, and R2: radius of curvature of each lens at the second lens array surface.

Here, the values of the above variables and conditional expressions set in this embodiment are shown in the above-mentioned Table 1.

In this embodiment, the lenses at the first lens array surface 34a in the lens array plate 34 form images of the emitter 31, which have the number identical to the number of lenses constituting the first lens array surface 34a, near the second lens array surface 35a, thereby making these multiple images illuminate the liquid crystal panel 37. Accordingly, influence of the fluctuation in brightness of the emitter can be eliminated. Namely, while the density remains to vary in the light quantity distribution of respective luminous fluxes passing through the first lens array surface 34a due to the fluctuation in emission characteristics of the emitter 31, the second lens array surface 35a projects the images of the opening portions of the respective lenses of the first lens array plate 34a with a magnification which fully covers the liquid crystal panel 37 and these images are superposed on the liquid crystal panel 37 with the number of superpositions corresponding to the number of the lenses. Accordingly, the fluctuation in illumination due to the emission characteristics of the emitter 31 can be reduced so as to realize uniform illumination.

The lens 36 disposed directly in front of the liquid crystal panel 37 functions to direct the illumination light to an appropriate direction. Namely, in cases where the object to be illuminated is a transmission type element and further projected to other objects to be illuminated by way of a projection lens as in the case of the above-mentioned first embodiment, the form and position of the lens 36 are set so as to direct light to a position near the entrance pupil of such a projection lens.

Here, the actions according to the above-mentioned conditional expressions (9), (10), (11), and (12) are substantially similar to those of the above-mentioned conditional expressions (1), (2), (3), and (4).

Next, the radius of curvature r (mm) of each member of the illumination optical system in accordance with the fourth embodiment, the central thickness of each member and air distance between respective members (generically referred to as "axial surface distance" in the following) d (mm), and refractive index N of each member with respect to d-rays are shown in Table 5. Also, this table shows the distance between the emitter and the reflector, the distance between the object to be illuminated and the lens, the size of the area to be illuminated, the opening sizes of respective lenses in the first and second lens array surfaces, and the shape of the reflector.

TABLE 5

|  | r | d | N |
|---|---|---|---|
| Reflector |  | 50.0 |  |
| Lens array plate | 3.437 | 10.3 | 1.48 |
|  | −3.225 | 200.0 |  |
| Lens | 103.7 | 5.5 | 1.52 |
|  | ∞ |  |  |

Position of the emitter: 15.0 mm from the reflector,
Position of the object to be illuminated: 10.0 mm from the surface of the lens facing the object,
Area to be illuminated: 28.0 mm×21.0 mm;
Opening size of each lens in the first lens array surface: 1.00 mm×0.75 mm,
Opening size of each lens in the second lens array surface: 1.03 mm×0.77 mm, and
Ellipsoidal surface shape of the reflector:
c=0.03516 and k=−0.8072 in the above-mentioned aspherical surface equation (13).

Without being restricted to the foregoing embodiments, the illumination optical system in accordance with the present invention can be altered in various manners. For example, the opening size of the reflector and the position of the emitter can be appropriately altered. These size and position are desirably determined such that, in view of the emission characteristics of the emitter, a large emission portion thereof can be utilized.

Also, the lens disposed in front of the object to be illuminated may be constituted by a plurality of lenses or an aspherical lens or Fresnel lens.

Further, in cases where the illumination light is not necessarily be directed in particular, for example, in the case where the above-mentioned object to be illuminated is the last object to be illuminated, the lens disposed in front of the object to be illuminated can be omitted.

As explained in the foregoing, in accordance with the illumination optical system of the present invention, in order to define the distances between three members, namely, two lens array plates (or two lens array surfaces) and the object to be illuminated, and their sizes, the concept of the ratio of conformity of the shapes of the openings of the lenses in these lens array plates (or lens array surfaces) to the shape of the area to be illuminated is considered while additionally taking account of the focal length of each lens. Accordingly, the position and size of each optical member in the integrator illumination technique can be obtained by relatively simple conditional expressions, thereby attaining uniform illumination, with a very high light utilization efficiency, securely free of the influences of fluctuation in brightness in the light-emitting portion and uneven light distribution characteristics.

Also, in the illumination optical system of the present invention, each optical member can be manufactured while its position and size are determined simply and securely in this manner, the efficiency in manufacture of the apparatus can be improved while reducing its manufacturing cost.

|  | k1 | k2 | s1 | s2 | f1 | f2 | $\frac{k1*s2}{s1}$ | $\frac{k2*(s1+s2)}{s1}$ | $\frac{f1*s2}{s1*(s1+s2)}$ | $\frac{f2*(s1+s2)}{s1*s2}$ |
|---|---|---|---|---|---|---|---|---|---|---|
| Embodiment 1 | 0.546 | 0.371 | 51.3 | 128.4 | 87.0 | 43.9 | 1.37 | 1.30 | 1.21 | 1.20 |
| Embodiment 2 | 0.136 | 0.121 | 28.8 | 309.5 | 44.7 | 41.6 | 1.46 | 1.42 | 1.42 | 1.58 |

|  | k1 | k2 | s1 | s2 | f1 | f2 | $\frac{k1*s2}{s1}$ | $\frac{k2*(s1+s2)}{s1}$ | $\frac{f1}{s1}$ | $\frac{f2*(s1+s2)}{s1*s2}$ |
|---|---|---|---|---|---|---|---|---|---|---|
| Embodiment 3 | 0.871 | 0.500 | 84.0 | 125.5 | 94.1 | 54.1 | 1.30 | 1.25 | 1.12 | 1.08 |

|  | k1 | k2 | d | s | R1 | R2 | $\frac{k1*s}{d}$ | $\frac{k2*s}{d}$ | $\frac{R1}{d}$ | $\frac{R2}{d}$ |
|---|---|---|---|---|---|---|---|---|---|---|
| Embodiment 4 | 0.0357 | 0.0368 | 10.3 | 200.0 | 3.437 | 3.225 | 0.69 | 0.75 | 0.33 | 0.31 |

What is claimed is:

1. An illumination optical system comprising, in this order, a light source portion constituted by an emitter and an ellipsoidal mirror whose cofocal positions are substantially at a position of said emitter and a position of an object to be illuminated; a first lens array plate formed by a plurality of lenses having substantially identical opening shapes arranged two-dimensionally; and a second lens array plate formed by a plurality of lenses having substantially identical opening shapes arranged two-dimensionally;

in which the opening shapes of respective lenses in said first and second lens array plates are substantially conformable to a shape of an area to be illuminated and the following conditional expressions (1) to (4) are satisfied:

$$1.0 < k1 \times s2/s1 < 1.8 \quad (1)$$

$$1.0 < k2 \times (s1+s2)/s1 < 1.8 \quad (2)$$

$$0.8 < f1 \times s2/[(s1 \times (s1+s2)] < 2.0 \quad (3)$$

$$0.8 < f2 \times (s1+s2)/(s1 \times s2) < 2.0 \quad (4)$$

wherein:

s1: distance between said first lens array plate and second lens array plate, s2: distance between said second lens array plate and said object to be illuminated, k1: ratio of conformity of the opening shape of each lens in said first lens array plate to the shape of said area to be illuminated, k2: ratio of conformity of the opening shape of each lens in said second lens array plate to the shape of said area to be illuminated, f1: focal length of said first lens array plate, and f2: focal length of said second lens array plate.

2. An illumination optical system according to claim 1, wherein a lens for directing illumination light from said second lens array plate to a predetermined position behind said object to be illuminated is disposed in front of said object to be illuminated.

3. An illumination optical system comprising, in this order, a light source portion constituted by an emitter and a parabolic mirror whose focal position is substantially at a position of said emitter; a first lens array plate formed by a plurality of lenses having substantially identical opening shapes arranged two-dimensionally; and a second lens array plate formed by a plurality of lenses having substantially identical opening shapes arranged two-dimensionally;

in which the opening shape of respective lenses in said first and second lens array plates are substantially conformable to a shape of an area to be illuminated, an optical axis of a lens in said first lens array plate and that of a lens corresponding thereto in said second lens array plate coincide with each other, and the following conditional expressions (5) to (8) are satisfied:

$$1.0 < k1 \times s2/s1 < 1.8 \quad (5)$$

$$1.0 < k2 \times (s1+s2)/s1 < 1.8 \quad (6)$$

$$0.7 < f1/s1 < 1.7 \quad (7)$$

$$0.8 < f2 \times (s1+s2)/(s1 \times s2) < 2.0 \quad (8)$$

wherein:

s1: distance between said first lens array plate and second lens array plate, s2: distance between said second lens array plate and said object to be illuminated, k1: ratio of conformity of the opening shape of each lens in said first lens array plate to the shape of said area to be illuminated, k2: ratio of conformity of the opening shape of each lens in said second lens array plate to the shape of said area to be illuminated, f1: focal length of said first lens array plate, and f2: focal length of said second lens array plate.

4. An illumination optical system according to claim 3, wherein a lens for directing illumination light from said second lens array plate to a predetermined position behind said object to be illuminated is disposed in front of said object to be illuminated.

5. An illumination optical system comprising, in this order, a light source portion constituted by an emitter and an ellipsoidal mirror whose cofocal positions are substantially at a position of said emitter and a position of an object to be illuminated and a lens array plate having first and second lens array surfaces which are formed by a plurality of lenses having substantially identical opening shapes arranged two-dimensionally such that said first lens array surface faces said emitter, in which the opening shapes of respective lenses in said first and second lens array surfaces are substantially conformable to a shape of an area to be illuminated and the following conditional expressions (9) to (12) are satisfied:

$$0.6 < k1 \times s/d < 1.2 \quad (9)$$

$$0.6 < k2 \times s/d < 1.2 \quad (10)$$

$$0.25 < R1/d < 0.45 \quad (11)$$

$$0.25 < R2/d < 0.45 \quad (12)$$

wherein:

d : thickness of said lens array plate, s : distance between said lens array plate and said object to be illuminated, k1: ratio of conformity of the opening shape of each lens at said first lens array surface (lens array surface facing said light source portion) to the shape of said area to be illuminated, k2: ratio of conformity of the opening shape of each lens at said first lens array surface (lens array surface facing said object to be illuminated) to the shape of said area to be illuminated, R1: radius of curvature of each lens at said first lens array surface, and R2: radius of curvature of each lens at said second lens array surface.

6. An illumination optical system according to claim 5, wherein a lens for directing illumination light from said second lens array surface to a predetermined position behind said object to be illuminated is disposed in front of said object to be illuminated.

* * * * *